United States Patent Office 3,128,230
Patented Apr. 7, 1964

3,128,230
MILK HAVING ANTIBODIES THEREIN AND
PROCESS FOR PRODUCING SAME
Wilfred F. Heinbach, Middleburg, Pa., assignor to Sunbury Milk Products Co., Sunbury, Pa., a corporation of Pennsylvania
No Drawing. Filed Apr. 4, 1961, Ser. No. 100,527
1 Claim. (Cl. 167—78)

This invention relates to milk having certain antibodies therein and process for producing same. More particularly, this invention relates to milk which has been obtained from milk-bearing animals which have been treated with a specific mixed bacterin vaccine in order to produce a milk having certain components therein providing a degree of immunization to those individuals imbibing same.

It has long been a primary thought in the field of immunology that considerable ease would result in the employment of milk from milk-bearing animals who had been subjected to special treatments. Consequently, the present invention is of extreme importance in that a milk product has been achieved which includes specific and non-specific proteins including albumins, globulins of alpha, beta, gamma components and intermediary globulin fractions, enzymes and unstated factors, produced by the administration of antigens parenterally, or by the gastro intestinal tract, or intrathecally, or into the glands of appendages of the skin, or into the glands of milk-bearing animals of all species. The antigens used are from either one or combinations of animal proteins or protein components; bacteria or bacterial products living, attenuated or dead; fungi or fungal products living, attenuated or dead; viruses or viral products living, attenuated or dead. The resulting product produced is a milk having the properties desired.

Accordingly, it is a primary object of the present invention to disclose a method for producing a milk having high immunological properties and a method for producing same.

It is another object of the present invention to disclose a method for treating animals of the milk-bearing variety in order to produce milk having components therein providing immunity to people imbibing same.

These, together with other objects and advantages which will become subsequently apparent reside in the details of the method and product as more fully hereinafter described and claimed.

The present invention contemplates the employment of a mixed bacterin vaccine having the following constituents:

|  | Million organisms per cubic centimeter |
|---|---|
| *Escherichia coli* (colon bacillus) | 200 |
| *Streptococcus* (*viridans*, hemolytic, and non-hemolytic) | 200 |
| *Diplococcus pneumoniae* (Pneumococcus) | 200 |
| *Staphylococcus aureus* | 300 |
| *Staphylococcus albus* | 300 |
| Total | 1200 |

The organisms in this vaccine are killed by conventional chemical means. The preservative is 0.35 percent refined Tricresol.

In employing the vaccine, the milk-bearing animals such as cows, are immunized with the vaccine by a minimum of four weekly subcutaneous injections of graded doses starting with 0.5 cc. for the first dose, and followed by 1 cc. doses until the serum of the blood of each animal shows a titer of no less than 1:40 in agglutination of the bacteria of the vaccine. Furthermore, the pasteurized milk obtained from the cows has a minimum agglutination titer of 1:40. The milk obtained from the animals once they have an antibody buildup to the desired extent, is collected twice daily, pooled, sampled, tested, pasteurized, bottled and frozen or freeze-dried and packaged in a conventional manner.

The milk when it is obtained from immunized cows, goats or other milk-bearing animals is processed in accordance with the regulations as specified in "Standard Methods for the Examination of Dairy Products," edited by the American Public Health Association and the Department of Agriculture, Division of Milk Sanitation, Commonwealth of Pennsylvania. The milk produced by the animals is also examined in accordance with the "Standard Methods for the Examination of Dairy Products," 11th edition, Americal Public Health Association, Inc., 1960.

In order to determine the immunization factor of the animals, they are bled prior to immunization and the sera are tested for agglutination of the bacteria of the vaccine. If found to be negative, the animals are inoculated with the vaccine. The bleeding of the animals is accomplished by taking blood from the ear of the animal or by skin puncture and drawn into a capillary tube or from the skin vein covering the udder by needle and vacuum tube at weekly intervals after the third injection. When the titer of the pasteurized milk is no less than 1:40, it is suitable for use.

Two methods for analysis of the immunizable milk after pasteurization is accomplished may be employed. In one operation, the milk is tested chemically in order to show an increase over the base line for an anticipated globulin content for the lactation-period, in days. The milk is analyzed for total protein, albumin and globulin content by the colorimetric Greenberg Method. Determination of the Serum Proteins, Journal of Biological Chemistry, vol. 82, page 545 (1929), and Greenberg and Mirolubovs, Modifications in the Colorimetric Determination of Plasma Protein by Folin Phenol Reagent, Journal of Laboratory Clinical Medicine, vol. 21, page 431, 1936. The values are used for the percentage compilation of the globulin component expressed by densiometric readings of stained paper strips after conventional electrophoretic fractionation of the protein and expressed graphically as an electrophoretic curve for the percentage calculation, which must show an increase of the total globulin content and beta and gamma globulins components.

The antibody potency can also be tested by absorption from the intestinal tract of the goose. This is accomplished by taking a goose weighing approximately eight pounds which is bled from the wing vein. The serum is separated from the blood and titered against the bacteria of the vaccine employed in the present invention, and if found negative, six ounces of the prepared milk is instilled into the stomach of the goose. After two and one-half hours the goose is bled from the wing vein and the serum is separated and titered for agglutination of the bacteria of the vaccine. The titer of the agglutination may not be less than 1:40.

Various methods for storing the immunological milk of the present invention may be employed. For instance, the pasteurized milk may be placed in one pint size standard paper milk carton and immediately frozen to a temperature of —20° F. Another method is to freeze-dry the milk by lyophilizing the pasterized milk into flakes by a freeze-dry apparatus. The flakes are collected aseptically. Two ounces of the flakes are equivalent to one pint liquid milk. In order to use the immunological milk of the present invention, it is a wise policy to thaw two pints of the frozen milk at room temperature when the milk is obtained in its frozen condition. One pint should be taken in the morning and one pint should be taken in the evening. The milk is most effective when the pint of milk is taken all at one time as quickly as possible, rather than being merely sipped. Furthermore, the milk is also more effective when it is taken on an empty stomach at least one hour before or after meals. When the milk is employed in its dry condition, cool fresh water should be added to a one pint container containing the dry milk. Again, one pint should be taken in the morning and one pint should be taken in the evening in the same manner as with the frozen milk. Care should be taken that the milk does not become too heated or is not brought to a boil, as this will destroy the antibodies.

It has been found that the milk of the present invention can be used for the treatment of various diseases and disease states and pathologic, physiologic states in human and lower animals due to bacterial, viral, fungal infections and parasitic infestations. Additionally, the milk is useful in alleviating allergic diseases and allergic states. Also, the milk may be employed to cure malnutritional states and protein deficiencies.

The foregoing is considered as illustrative only of the principles of the invention. Further, since numerous modifications and changes will readily occur to those skilled in the art, it is not desired to limit the invention to the exact method and product as shown and described, and accordingly, all suitable modifications and equivalents may be resorted to, falling within the scope of the invention as claimed.

What is claimed as new is as follows:

In a method for producing controlled bacterial antibody potency at a minimum agglutination titer of 1:40 in an immunological milk product containing bacterial antibodies, produced by milking lactating mammals which have previously been immunized by a graded series of subcutaneous injections, administered at predetermined intervals, of a mixed bacterin vaccine having a 1,200 million total killed organism content of the following component organisms per cubic centimeter:

| | |
|---|---|
| *Escherichia coli* (colon bacillus) | 200 million |
| *Streptococcus* (*viridans,* hemolytic and non-hemolytic) | 200 million |
| *Diplococcus pneumoniae* (Pneumococcus) | 200 million |
| *Staphylococcus aureus* | 300 million |
| *Staphylococcus albus* | 300 million | until both the serum of the blood and the milk obtained from the immunized lactating mammals have a bacterial antibody agglutination titer of no less than 1:40, the improvement which consists essentially of the following steps:

(a) obtaining a quantity of milk from said immunized lactating mammal, selecting a sample of milk therefrom, and instilling the milk sample into the stomach of an avian host subject constituting an agglutination-titer diagnostic intermediate, (b) said avian host subject being seronegative to the bacterial components of the mixed bacterin vaccine;

(c) removing blood from said avian host subject and separating the serum therefrom;

(d) titering the avian serum for agglutination of the bacterial components of the mixed bacterin vaccine; and (e) selecting for immunological purposes quantities of the milk wherein a milk sample obtained therefrom produces an agglutination titer of not less than 1:40 in the serum of the seronegative avian host subject.

References Cited in the file of this patent

FOREIGN PATENTS 837,695     Great Britain     June 15, 1960

OTHER REFERENCES

"Mother Protects Baby," Science News Letter for March 31, 1956, page 197.

Petersen et al.: "Use of Protective Principles in Milk and Colostrum in Prevention of Disease in Man and Animals," Quarterly Review of Allergy and Applied Immunology, vol. 10, No. 2, pp. 185–186, June 1956.

Campbell et al.: "Diathetic Immunization—A Maternal-Offspring Relationship Involving Milk Antibodies," Science, vol. 125, No. 3254, pp. 932–933, May 10, 1957.

Lemcke et al.: "Antibody Content of Colostrum and Piglet Serum Following Vaccination of the Sow," J. Comp. Path., vol. 71, pp. 268–278, July 1961.